O. H. SMITH.
TUBING CHAIN-WRENCH.

No. 181,990. Patented Sept. 5, 1876.

UNITED STATES PATENT OFFICE.

ORLANDO H. SMITH, OF KANE CITY, PENNSYLVANIA.

IMPROVEMENT IN TUBING-CHAIN WRENCHES.

Specification forming part of Letters Patent No. 181,990, dated September 5, 1876; application filed July 26, 1875.

*To all whom it may concern:*

Be it known that I, ORLANDO H. SMITH, of Kane City, in the county of Venango and State of Pennsylvania, have invented a new and Improved Tubing-Chain; and I do hereby declare that the following is a full, clear, and exact description of the same, reference being had to the accompanying drawing, forming part of this specification, in which—

Figure 1:
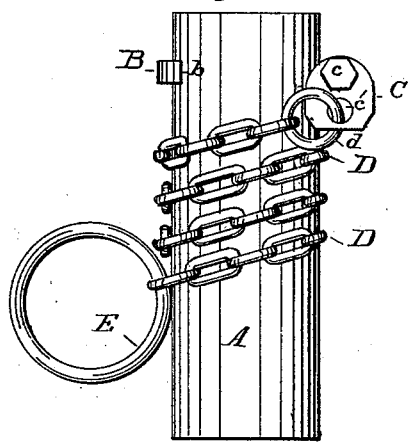
Figure 2:
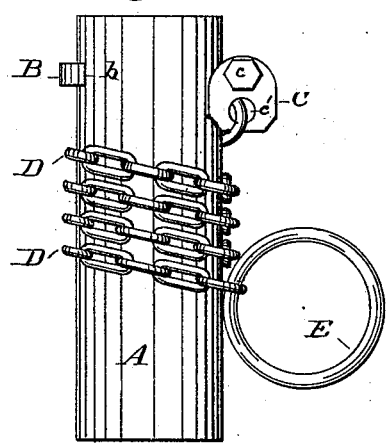
Figure 3:
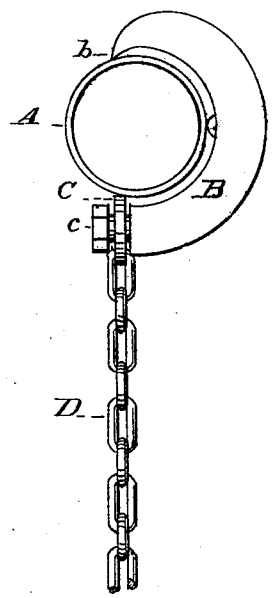

Figure 1 represents my invention applied to a section of tube with the chain wound from right to left. Fig. 2 represents the same, with the chain wound from left to right. Fig. 3 represents a plan of my invention.

The object of this invention is the construction of a device whereby a section of perpendicular tubing, such as that of oil-wells, may be turned more or less on its axis without danger of being cut, dented, bruised, or otherwise injured.

The invention consists in joining together by a reversible dog, a chain, and hook. The latter, which is for the purpose of maintaining the hold of the chain on the pipe, has its point formed into an inwardly-projecting claw, and is provided near the middle of its concavity with a slightly-projecting blunt point. These projections form two of the bearing-points against the tube, over which the hook rests. The third is formed by the edge of the dog. To the free end of the chain is secured a ring, into which a lever is inserted when the device is to be used.

In the drawing, A represents a section of perpendicular pipe, with the device attached. B is the hook, provided with terminating-claw $b$, and middle projection $b'$. C is the dog, swiveled on the neck of the hook, to which it is secured by a nut, $c$. $c'$ is a hole in the rear portion of the dog, through which passes a ring, $d$, having secured to it the chain D. On the further end of said chain is fixed the ring E for insertion of the lever.

The mode of operation of the invention is as follows: The hook being in position, the winding of the chain around the tube below the hook brings the lower edge of the dog to bear against the tube, thus securing the hook against the latter. This takes place whichever way the chain is wound, so that the latter may be reversed without removing the hook from the chain.

The manner of securing the dog to the chain and hook makes it also reversible, so that the hook may be placed with either side up, and the projection $b'$ prevents it from sitting inclined either up or down on the tube. The chain, being wound around the tube, bears against the latter throughout its entire length, and relieves the pressure that would otherwise be exerted on the tube by the dog and hook, thus preventing them from cutting, denting, or otherwise injuring it.

The lever may, if desirable, be passed to its middle point through the ring E.

What I claim is—

The tube-turning device composed of the hook B, (provided with projections $b$ and $b'$,) swiveled dog C, chain D, and ring E, all constructed and arranged substantially as shown and described, for the purpose specified.

ORLANDO H. SMITH.

Witnesses:
O. M. COOK,
SAM. REYNOLDS.